US011882476B2

(12) United States Patent
Xie et al.

(10) Patent No.: US 11,882,476 B2
(45) Date of Patent: Jan. 23, 2024

(54) CONFIGURATION OF USER PLANE FUNCTIONS FOR WIRELESS SYSTEMS

(71) Applicant: ZTE Corporation, Guangdong (CN)

(72) Inventors: Feng Xie, Guangdong (CN); Liping Wang, Guangdong (CN); Guanghui Yu, Guangdong (CN); Tao Qi, Guangdong (CN)

(73) Assignee: ZTE Corporation, Guangdong (CN)

( * ) Notice: Subject to any disclaimer, the term of this patent is extended or adjusted under 35 U.S.C. 154(b) by 146 days.

(21) Appl. No.: 17/360,559

(22) Filed: Jun. 28, 2021

(65) Prior Publication Data

US 2021/0329484 A1 Oct. 21, 2021

Related U.S. Application Data

(63) Continuation of application No. PCT/CN2018/124892, filed on Dec. 28, 2018.

(51) Int. Cl.
*H04W 4/00* (2018.01)
*H04W 28/02* (2009.01)

(52) U.S. Cl.
CPC .................. *H04W 28/02* (2013.01)

(58) Field of Classification Search
CPC .... H04W 28/02; H04W 28/0252; H04W 8/24
See application file for complete search history.

(56) References Cited

U.S. PATENT DOCUMENTS

| 10,924,975 | B2 | 2/2021 | Baek et al. | |
| 10,980,043 | B2 | 4/2021 | He et al. | |
| 2011/0255510 | A1* | 10/2011 | Rydnell | H04W 80/045 370/328 |

(Continued)

FOREIGN PATENT DOCUMENTS

| CN | 101316194 A1 | 12/2008 |
| CN | 104683955 A | 6/2015 |

(Continued)

OTHER PUBLICATIONS

Chinese Office Action for Application No. 201880100550.7, dated Dec. 26, 2022, 17 pages with unofficial translation.

(Continued)

*Primary Examiner* — Shantell L Heiber
(74) *Attorney, Agent, or Firm* — Perkins Coie LLP

(57) ABSTRACT

Methods, systems, and devices for configuring user plane functions in mobile communication technology are described. An exemplary method for wireless communication includes determining, at a network node, a processing order for processing a plurality of user plane functions based on at least one of a type of service, a deployment type, a connection mode, one or more capabilities of the network node, or one or more capabilities of a wireless device, and transmitting, to the wireless device, a first control plane message comprising the processing order. Another exemplary method for wireless communication includes receiving, from a network node, a first control plane message comprising information that includes a processing order for processing a plurality of user plane functions, and processing, at the wireless device, a plurality of user plane functions based on the processing order.

18 Claims, 7 Drawing Sheets

(56) References Cited

U.S. PATENT DOCUMENTS

| | | |
|---|---|---|
| 2014/0286295 A1 | 9/2014 | Liu et al. |
| 2015/0188681 A1* | 7/2015 | Li .................. H04L 5/0032 370/252 |
| 2017/0171724 A1 | 6/2017 | Kazmi et al. |
| 2018/0205732 A1 | 7/2018 | Zhang et al. |
| 2018/0343600 A1* | 11/2018 | Ma .................. H04W 12/02 |
| 2019/0058508 A1* | 2/2019 | Yiu .................. H04B 17/336 |
| 2019/0159021 A1* | 5/2019 | Zhao ............... H04W 28/0252 |
| 2020/0084661 A1* | 3/2020 | Hannu .............. H04W 80/08 |

FOREIGN PATENT DOCUMENTS

| | | |
|---|---|---|
| CN | 105451189 A | 3/2016 |
| CN | 107079524 A | 8/2017 |
| CN | 108012338 A | 5/2018 |
| WO | 2009/095070 | 8/2009 |
| WO | 2017/052342 A1 | 3/2017 |
| WO | 2018001297 A1 | 1/2018 |
| WO | 2018086674 A1 | 5/2018 |
| WO | 2018/137232 | 8/2018 |
| WO | 2018137232 A1 | 8/2018 |
| WO | 2018/198011 | 11/2018 |

OTHER PUBLICATIONS

Nokia, "Selection of user plane functional entity deployed at the edge local network" SA WG2 Meeting #114 S2-162153, Apr. 11-15, 2016, Sophia Antipolis, France, 3 pages.

Canadian Office Action for Canadian Application No. 3,125,218, dated Jan. 3, 2023, 4 pages.

European Search Report for EP Patent Application No. 18930094.0, dated Dec. 10, 2021, 9 pages.

International Search Report and Written Opinion dated Jul. 25, 2019 for International Application No. PCT/CN2018/124892, filed on Dec. 28, 2018 (6 pages).

Canadian Office Action for Canadian Application No. 3,125,218, dated Oct. 27, 2023, 6 pages.

Korean Office Action for Co-Pending Application No. 10-2021-7023314 dated Oct. 4, 2023 7 pages with unofficial translation.

* cited by examiner

US 11,882,476 B2

CONFIGURATION OF USER PLANE FUNCTIONS FOR WIRELESS SYSTEMS

CROSS-REFERENCE TO RELATED APPLICATIONS

This application is a continuation of International Patent Application No. PCT/CN2018/124892, filed on Dec. 28, 2018, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. The supported services are becoming more and more abundant, from IoT services with very small throughput to eMBB services with very high throughput requirements. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring user equipment to configure user plane functions based as required.

SUMMARY

This document relates to methods, systems, and devices for configuring user plane functions in mobile communication technology, including 5th Generation (5G) New Radio (NR) communication systems and future communication systems.

In one exemplary aspect, a wireless communication method is disclosed. The method includes determining, at a network node, a processing order for processing a plurality of user plane functions based on at least one of a type of service, a deployment type, a connection mode, one or more capabilities of the network node, or one or more capabilities of a wireless device, and transmitting, to the wireless device, a first control plane message including the processing order.

In another exemplary aspect, a wireless communication method is disclosed. The method includes receiving, from a network node, a first control plane message including information that includes a processing order for processing a plurality of user plane functions, where the processing order is based on at least one of a type of service, a deployment type, a connection mode, one or more capabilities of the network node, or one or more capabilities of a wireless device, and processing, at the wireless device, a plurality of user plane functions based on the processing order.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

There is an increasing demand for fourth generation of mobile communication technology (4G, the 4th Generation mobile communication technology), Long-term evolution (LTE, Long-Term Evolution), Advanced long-term evolution (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

Existing implementations of cellular communication networks provide a processing sequence of user plane functions that is fixed, and cannot be flexibly arranged according to service or deployment requirements. Embodiments of the disclosed technology advantageously enable the configuring of user plane functions based on one or more characteristics of the cellular system, and/or the capabilities of the network node or the wireless device.

Figure 1:
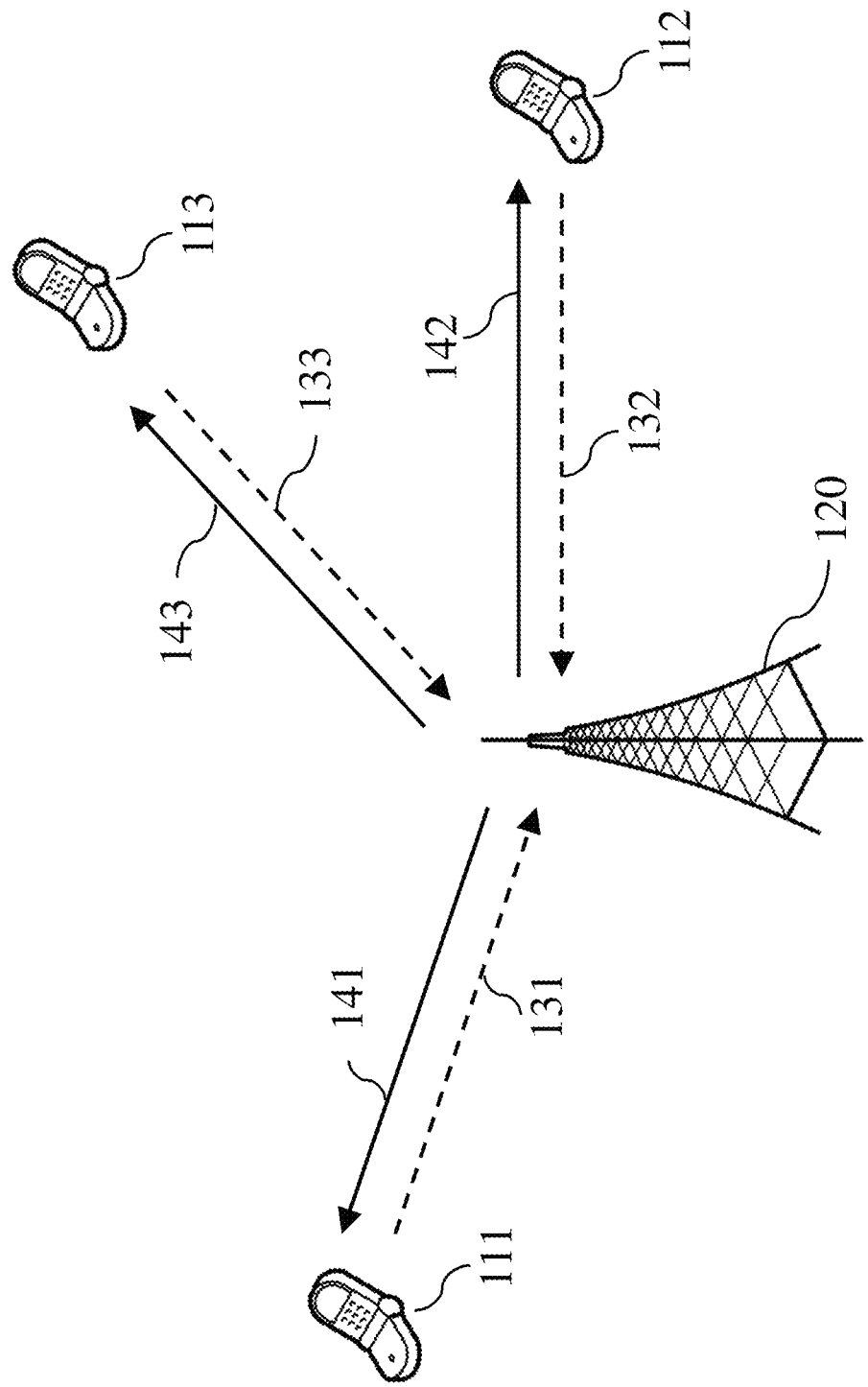
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G New Radio (NR) cellular network) that includes a BS 120 and one or more user equipment (UE) 111, 112 and 113. In some embodiments, the downlink transmissions (141, 142, 143) include a control plane message that comprises a processing order for processing the plurality of user plane functions. This may be followed by uplink transmissions (131, 132, 133) based on the processing order received by the UEs. Similarly, the user plane functions can be processed by UEs for downlink transmissions based on the processing order received. The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Overview of Configuring User Plane Functions

Figure 2:
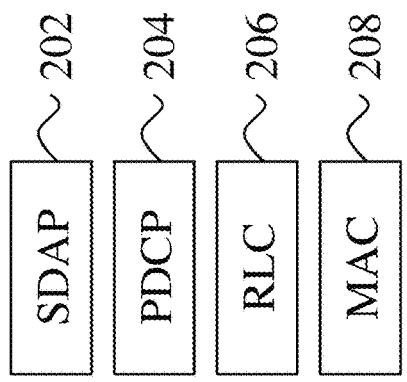
FIG. 2 shows an example of user plane functions in New Radio (NR).

The user plane function generally refers to the function of processing service data. For the 5G NR radio access network, the user plane includes the SDAP layer 202, the PDCP layer 204, the RLC layer 206, and the MAC layer 208, as shown in FIG. 2. The SDAP layer 202 is responsible for the mapping/demapping of QoS flows (data streams sent by the core network to the access network) to the data radio bearers DRBs and marking the QFI for each uplink and downlink QoS flows packet if necessary. The PDCP layer 204 provides header compression/decompression, encryption/decryption, and order-preserving services. The RLC layer 206 provides segmentation and reassembly and ARQ services. The MAC layer 208 provides mapping of logical channel to transport channel, multiplexing and/or demultiplexing, scheduling/priority processing, HARQ, concatenating packet/unpacking services.

Figure 3:
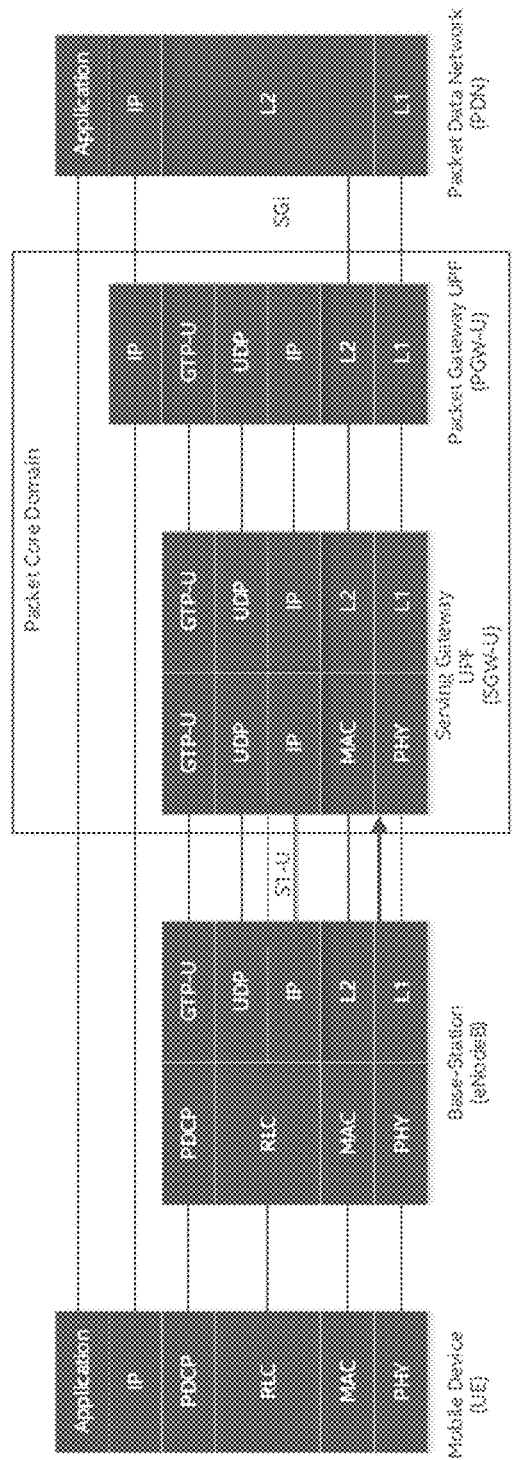
FIG. 3 shows an example of the protocol structure in an LTE network.

FIG. 3 shows an example of the protocol structure in an LTE network. As shown therein, the UE (or mobile device, or wireless device) communicates with the BS (base station, or gNB node, network node), which is connected to the packet core domain that includes the serving gateway and the packet gateway, and the gateway functionality is connected to a packet data network (or the Internet). Embodiments of the presently disclosed technology, which enables the configuring of user plane functions, may be implemented at any point in the cellular architecture shown in FIG. 3. For example, user plane functions may be configured at an ingress or egress point of the gateway, or between the UE and the BS.

In some embodiments, the base station control plane function orchestrates the order (or upper and lower positions) of the protocol layer of the user plane UE according to a policy that is based on the service type (e.g., EMBB, URLLC, mMTC or slice type), deployment type (e.g., CU/DU separation or CU/DU integrated deployment, or whether it is deployed with the core network user plane function), connection mode type (e.g., single connection, dual connection, multiple connection), UE capabilities (e.g., supported protocol layer order) or network side capabilities (e.g., supported protocol layer order). In an example, the control plane function may decide to adopt the order of the SDAP/PDCP/RLC layer, whereas in another example, the control plane function may decide to follow the order of PDCP/RLC/SDAP. For the SDAP/PDCP/RLC/MAC order in 5G NR, the QoS flow to DRB mapping is placed above the PDCP function including robust overhead compression (ROHC) and security. While for the PDCP/RLC/SDAP/MAC order, the SDAP function (e.g., QoS flow mapping) is placed directly above the MAC layer so that QoS flow mapping can be dynamically adjusted according to the feedback of MAC or the condition of radio interface. Owing to that, the QoS of each flow can be guaranteed in real-time, which is better than the SDAP/PDCP/RLC/MAC order.

Exemplary Embodiments for Configuring User Plane Functions

Configuration mode 1. In some embodiments, the base station configures the UE user plane function processing sequence to the UE through an RRC message. In other embodiments, the base station control plane function (for example, CU-CP) can also configure the UE user plane function processing sequence through a control plane message (for example, an E1 interface message) or user-plane processing functions on the network side (for example, CU-UP). The base station can also be configured to the UE by control plane messages, including numbers, indices, identities, types or patterns, which can represent a particular processing order. These numbers, indexes, identities, or types may be used to indicate a particular processing order; e.g., index 1 may represent the order SDAP/PDCP/RLC, and index 2 may represent the order PDCP/RLC/SDAP. The specific processing order may also be implicitly or jointly indicated while indicating other meanings, such as slice identifier 1. For example, when the specific slice identifier is indicated, the slice type carried in the slice identifier may be associated with a specific processing order, thereby implicitly indicating a specific processing order.

Configuration mode 2. In some embodiments, base station configures the next layer (or next function) of a layer (or a function) of the UE through an RRC message, or indicates a layer (or function) under the current layer (or current function), or indicate the processing layer (or function) above the current layer (or current function). That is, the RRC message specifies a layer (or function) relative to a layer (or function) in the existing processing order. For example, one configuration may be defined as the SDAP, followed by the PDCP, and followed by the RLC. The configuration in a message may specify that the PDCP should be followed by the SDAP, and the configuration is then changed to PDCP/SDAP/RLC upon receiving and processing the message. The base station control plane function (for example, CU-CP) can also be configured to the network side user plane processing function (for example, CU-UP) by a control plane message (for example, an E1 interface message) in a similar manner.

Configuration mode 3. In some embodiments, the processing order configuration includes a "difference configuration" for indicating a processing order difference between the existing and new processing orders. In an example, the existing (or original) processing order is SDAP/PDCP/RLC. If the configuration includes an SDAP down-level indication, the sequence is adjusted to PDCP/SDAP/RLC. If the configuration includes an SDAP down-two-level indication, the sequence is adjusted to PDCP/RLC/SDAP. In another example, the existing processing order is PDCP/RLC/SDAP; if the configuration includes the SDAP up-shift indication, the sequence is adjusted to PDCP/SDAP/RLC, and if the configuration includes an SDAP up-two-level indication, the sequence is adjusted to SDAP/PDCP/RLC.

Other configuration aspects. In some embodiments, the UE may also request a specific UE user plane function processing sequence through the control plane message, and the base station control plane function may accept or reject the request after receiving the request, and if rejected, the base station performs UE user plane processing function on the UE again.

In some embodiments, the aforementioned configurations may be a network-level configuration, a cell-level configuration, a UE-level configuration, a session-level configuration, a connection-level/link-level configuration, a bearer-level configuration, a flow-level configuration or a slice-level configuration.

In some embodiments, the methods described above can also change the scheduling function of the base station control plane to the core network control plane or the service-based or architecture-based control plane function. The described embodiments are not limited to RRC messages or F1-C messages or E1 messages, but may include non-access stratum NAS messages, and/or service plane-based control plane messages.

Figure 4:
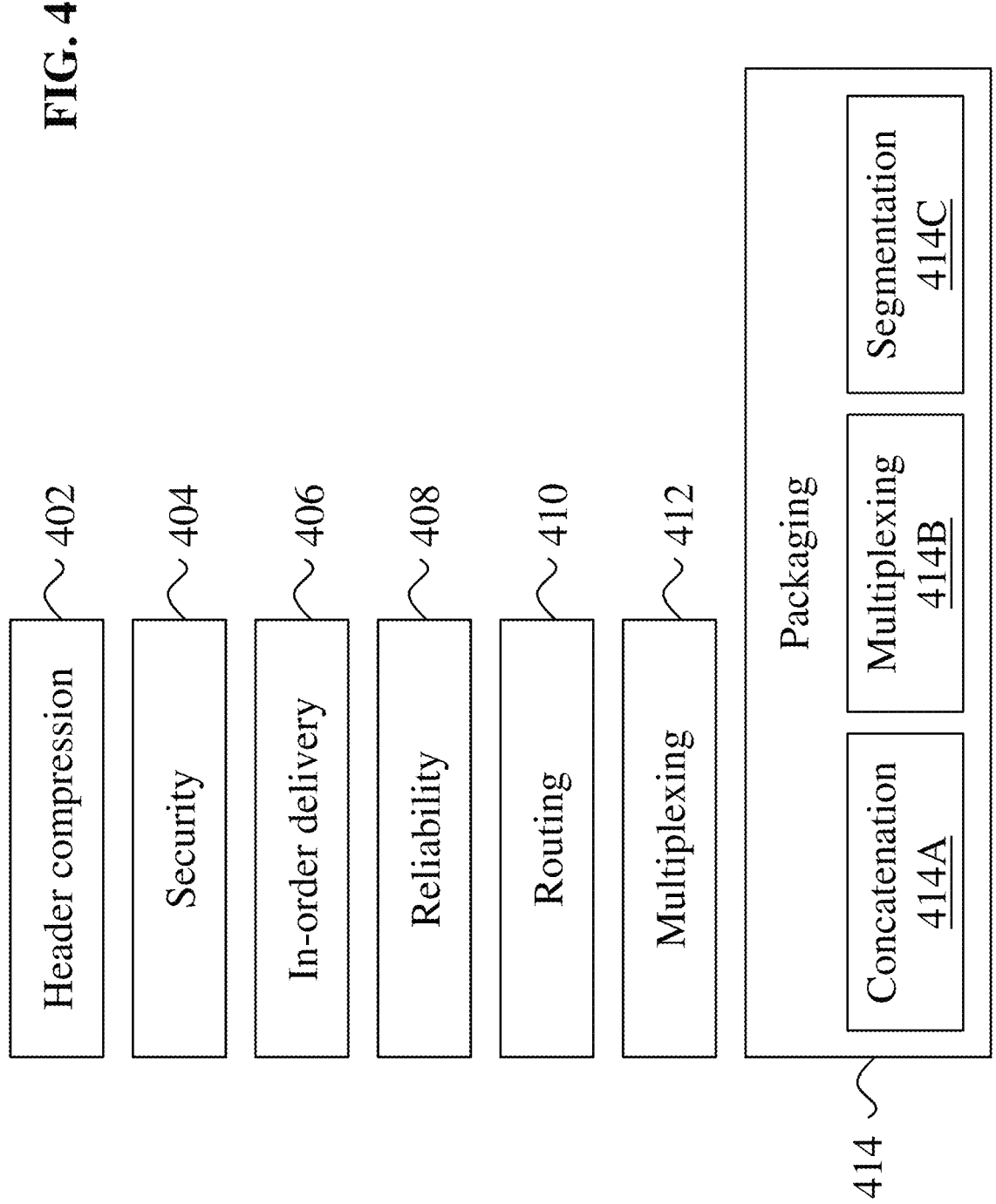
FIG. 4 shows another example of user plane functions.

In some embodiments, the embodiments described above may be applied to protocol layers in addition to (or instead of) the user plane functions. That is, the method can be extended to perform user plane orchestration according to protocol processing functions as shown in the example in FIG. 4. The protocol processing function includes the header compression (e.g., ROHC) function 402, secure processing (encryption/guarantee) function 404, an order-preserving (guaranteed delivery in order) function 406, a reliability (e.g., ARQ) function 408, service adaptation function (e.g., mapping of IP flow to QoS flow or mapping of QoS flow to bearer, and not shown in FIG. 4), a routing function 410, a multiplexing function 412, and a group packaging (e.g., concatenating, segmentation, re-segmentation) function 414, which includes the concatenation 414A, multiplexing 414B and segmentation 414C sub-functions that may also be configured as part of the processing order.

In some embodiments, the processing order comprising a new configuration may configure one or more of the functions or protocols. In an example, all the functions or protocols may be configured. In another example, a only subset of functions may be configured. In yet another example, an identical set of functions (or the protocol layers) are not necessarily configured for each UE. That is, the user plane functions or protocol layers in different devices may be configured independently.

Figure 5:
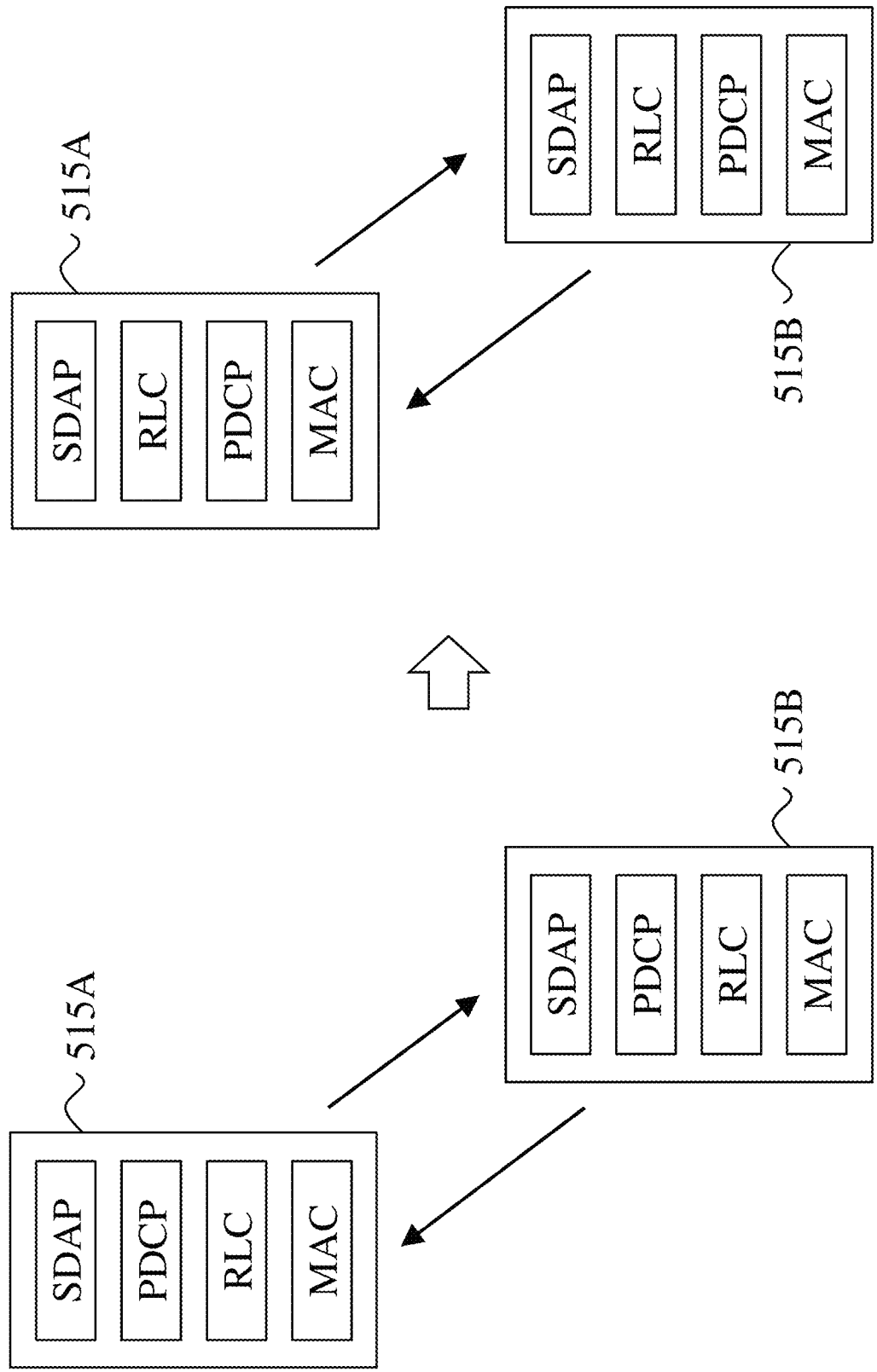
FIG. 5 shows an example of configuring user plane functions, in accordance with some embodiments of the presently disclosed technology.

FIG. 5 shows an example of configuring user plane functions, in accordance with some embodiments of the presently disclosed technology. As shown therein, a first device 515A communicates with a second device 515B, each being configured with the user plane functions arranged as SDAP/PDCP/RLC/MAC. In an example, if a packet were being transmitted from the first device 515A to the second device 515B, it would be initially processed by the transmitter in the order: SDAP layer, PDCP layer, RLC layer and MAC layer. Subsequent to over-the-air transmission, the packet would then be processed by the receiver in the order: MAC layer, RLC layer, PDCP layer and SDAP layer.

More generally, if a function B is a lower layer function of function A, then when transmitting from the first device 515A to the second device 515B, a packet would be processed by function A then function B in the transmitter (e.g., first device 515A), and function B and then function A in the receiver (e.g., second device 515B).

In an example, the original order (SDAP/PDCP/RLC/MAC) shown in FIG. 5 may be suitable for applications that require the RLC layer (which is responsible for ARQ operation) to process encrypted packets, since the PDCP layer that provides encryption/decryption is above the RLC layer. However, other applications may require all packet contents to be encrypted, thus requiring a new order (SDAP/RLC/PDCP/MAC), wherein the PDCP layer is the lowest layer (and directly above the MAC layer). Thus, as shown in FIG. 5, (SDAP/PDCP/RLC/MAC) may be transformed to (SDAP/RLC/PDCP/MAC) for subsequent communications.

Exemplary Methods for the Disclosed Technology

Embodiments of the presently disclosed technology advantageously enable the configuring of user plane functions based on one or more characteristics of the cellular system, and/or the capabilities of the network node or the wireless device. Some features of the embodiments described herein include, but are not limited to, the following:

The UE user plane function processing order can be configured or arranged.

Configuring the UE user plane function processing sequence to the UE by using control plane messages (such as RRC or NAS messages).

The UE user plane function processing sequence is configured to the network side user plane processing function by using the control plane message.

Control plane messages include numbers, indexes, identities, types, or patterns that can represent a particular processing order.

The control plane message includes an indication processing function that implicitly or explicitly indicates the next processing function of the previous function, or indicates a processing function under the current function, or indicates a processing function that is above the current function.

The processing order configuration includes a difference configuration for indicating the difference in processing order between the agreed and previously determined processing order.

The UE requests a specific UE user plane function processing sequence through a control plane message request.

These configurations may be network-level configurations, cell-level configurations, UE-level configurations, session-level configurations, connection-level configurations, bearer-level configurations, flow-level configurations, or slice-level configurations.

Figure 6:
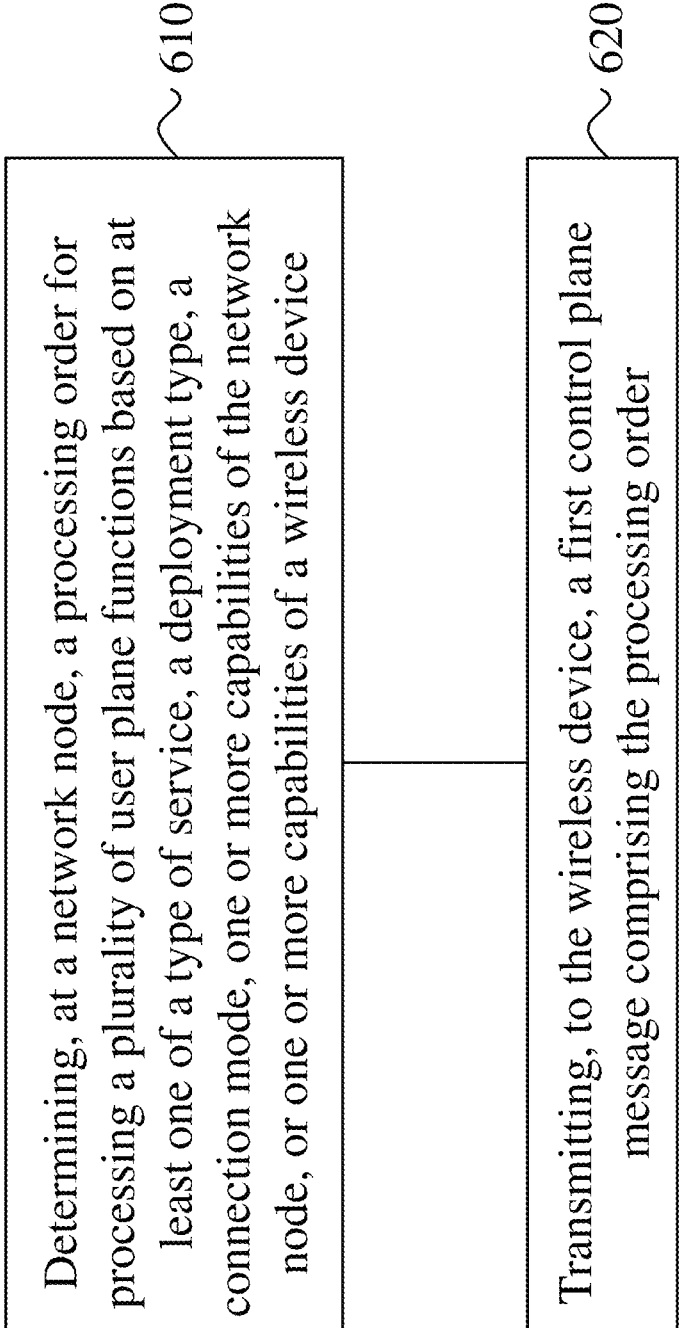
FIG. 6 shows an example of a wireless communication method.

FIG. 6 shows an example of a wireless communication method 600 for configuring user plane functions. The method 600 includes, at step 610, determining, at a network node, a processing order for processing a plurality of user plane functions based on at least one of a type of service, a deployment type, a connection mode, one or more capabilities of the network node, or one or more capabilities of a wireless device.

The method 600 includes, at step 620, transmitting, to the wireless device, a first control plane message comprising the processing order.

In some embodiments, the processing order comprises one of a network-level configuration, a cell-level configuration, a UE-level configuration, a session-level configuration, a connection link-level configuration, a bearer-level configuration, a flow-level configuration or a slice-level configuration.

In some embodiments, the plurality of user plane functions comprise one or more of a service data adaptation protocol layer, a packet data convergence protocol layer and a radio link control layer. In other embodiments, the plurality of user plane functions comprise one or more of a service adaptation function, a header compression function, a security function, an in-order delivery function, a reliability function, a routing function, a concatenation function, a multiplexing function, and a segmentation function.

Figure 7:
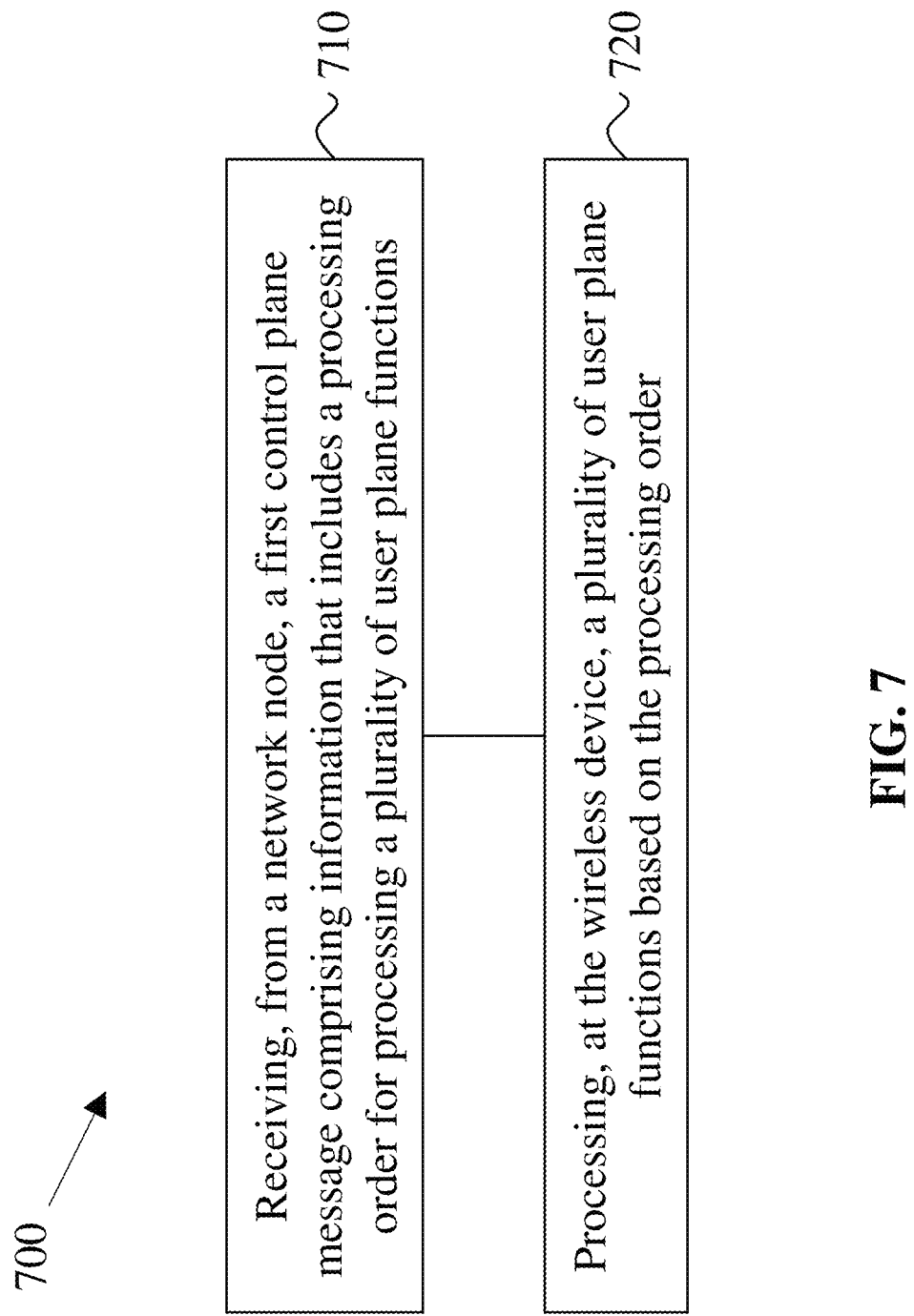
FIG. 7 shows an example of another wireless communication method.

FIG. 7 shows another example of a wireless communication method 700 for configuring user plane functions. This example includes some features and/or steps that are similar to those shown in FIG. 6, and described above. At least some of these features and/or steps may not be separately described in this section.

The method 700 includes, at step 710, receiving, from a network node, a first control plane message comprising information that includes a processing order for processing a plurality of user plane functions, where the processing order is based on at least one of a type of service, a deployment type, a connection mode, one or more capabilities of the network node, or one or more capabilities of a wireless device.

The method 700 includes, at step 720, processing, at the wireless device, a plurality of user plane functions based on the processing order.

In some embodiments, the method 700 may further include the steps of determining, at the wireless device and prior to receiving the first control plane message, the processing order for processing the plurality of user plane functions, and transmitting, to the network node, a second control plane message comprising a request that includes the processing order.

In some embodiments, and in the context of methods 600 and 700, the processing order comprises an explicit ordering of each user plane function of the plurality of user plane functions. In other embodiments, the processing order comprises a relative position of a first of the plurality of user plane functions with respect to a second of the plurality of user plane functions. In yet other embodiments, the processing order comprises an offset for exactly one user plane function of the plurality of user plane functions, and wherein the offset specifies an explicit adjustment of the exactly one user plane function in an initial processing order.

In some embodiments, and in the context of methods 600 and 700, the first control plane message is a radio resource control (RRC) message or a non-access stratum (NAS) message, the type of service is one of enhanced Mobile Broadband (eMBB), Ultra Reliable Low Latency Communications (URLLC) or massive Machine Type Communications (mMTC), the deployment type is one of a separated control unit (CU) and distributed unit (DU) or an integrated CU and DU, the connection mode is a single connection, a dual connection or a multiple connection, and the one or more capabilities of the wireless device or the network node comprise a supported user plane function order.

The aforementioned methods may be applied to various fields of wireless communication technology, including relay (or access backhaul integration), UE relay (e.g., UE providing relay functionality for another UE), single connection, dual connection or multi-connection operation, multi-system collaboration, fixed-line mobile network convergence, multi-access edge computing (MEC), edge-computing and other scenarios.

Implementations for the Disclosed Technology

Figure 8:
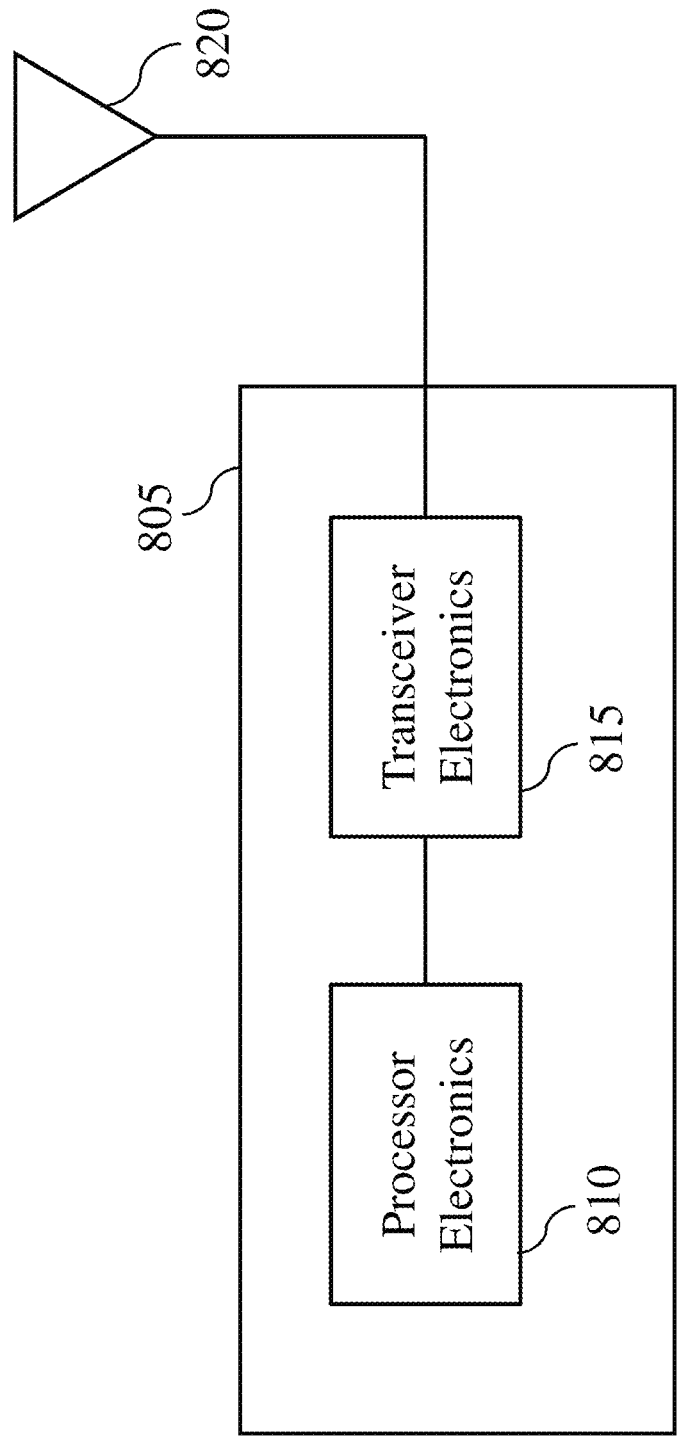
FIG. 8 is a block diagram representation of a portion of an apparatus, in accordance with some embodiments of the presently disclosed technology.

FIG. 8 is a block diagram representation of a portion of an apparatus, in accordance with some embodiments of the presently disclosed technology. An apparatus 805, such as a base station or a wireless device (or UE), can include processor electronics 810 such as a microprocessor that implements one or more of the techniques presented in this document. The apparatus 805 can include transceiver electronics 815 to send and/or receive wireless signals over one or more communication interfaces such as antenna(s) 820. The apparatus 805 can include other communication interfaces for transmitting and receiving data. Apparatus 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the apparatus 805.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
determining, at a wireless device, prior to receiving a first control plane message from a network node, a specific processing order for processing a plurality of user plane functions;
transmitting, by the wireless device to the network node, a second control plane message comprising a request that indicates the specific processing order;
receiving, from the network node, the first control plane message comprising information that indicates a processing order for processing the plurality of user plane functions comprising a service data adaptation protocol layer, a packet data convergence protocol layer and a radio link control layer, wherein the processing order is based on at least one of a type of service, a deployment type, a connection mode, one or more capabilities of the network node, or one or more capabilities of a wireless device; and
processing, at the wireless device, the plurality of user plane functions based on the processing order,
wherein the processing order is indicated using numbers, indexes, identities, or types, each representing a particular processing order that specifies a sequence of processes among the service data adaptation protocol layer, a packet data convergence protocol layer and a radio link control layer that are included in the plurality of user plane functions.

2. The method of claim 1, wherein the processing order comprises an explicit ordering of each user plane function of the plurality of user plane functions.

3. The method of claim 1, wherein the processing order comprises a relative position of a first of the plurality of user plane functions with respect to a second of the plurality of user plane functions.

4. The method of claim 1, wherein the processing order comprises an offset for exactly one user plane function of the plurality of user plane functions, and wherein the offset specifies an explicit adjustment of the exactly one user plane function in an initial processing order.

5. The method of claim 1, wherein the processing order comprises one of a network-level configuration, a cell-level configuration, a UE-level configuration, a session-level configuration, a connection link-level configuration, a bearer-level configuration, a flow-level configuration or a slice-level configuration.

6. The method of claim 1, wherein the first control plane message is a radio resource control (RRC) message or a non-access stratum (NAS) message.

7. The method of claim 1, wherein the type of service is one of enhanced Mobile Broadband (eMBB), Ultra Reliable Low Latency Communications (URLLC) or massive Machine Type Communications (mMTC).

8. The method of claim 1, wherein the deployment type is one of a separated control unit (CU) and distributed unit (DU) or an integrated CU and DU.

9. The method of claim 1, wherein the connection mode is a single connection, a dual connection or a multiple connection.

10. The method of claim 1, wherein the one or more capabilities of the wireless device or the network node comprise a supported user plane function order.

11. The method of claim 1, wherein the plurality of user plane functions comprises one or more of a service adaptation function, a header compression function, a security function, an in-order delivery function, a reliability function, a routing function, a concatenation function, a multiplexing function, and a segmentation function.

12. A method for wireless communication, comprising:
receiving, at a network node, prior to transmitting a first control plane message, a second control plane message from a wireless device requesting a specific processing order that is determined by the wireless device for processing a plurality of user plane functions;
determining, at the network node, a processing order for processing the plurality of user plane functions comprising a service data adaptation protocol layer, a packet data convergence protocol layer and a radio link control layer, wherein the processing order is determined based on at least one of a type of service, a deployment type, a connection mode, one or more capabilities of the network node, or one or more capabilities of a wireless device; and
transmitting, to the wireless device, the first control plane message comprising the processing order,
wherein the processing order is indicated using numbers, indexes, identities, or types, each of numbers, indexes, identities, or types representing a particular processing order that specifies a sequence of processes among the service data adaptation protocol layer, a packet data convergence protocol layer and a radio link control layer that are included in the plurality of user plane functions.

13. The method of claim 12, wherein the processing order comprises (a) an explicit ordering of each user plane function of the plurality of user plane functions, (b) a relative position of a first of the plurality of user plane functions with respect to a second of the plurality of user plane functions, or (c) an offset for exactly one user plane function of the plurality of user plane functions, wherein the offset specifies an explicit adjustment of the exactly one user plane function in an initial processing order.

14. The method of claim 12, wherein the plurality of user plane functions comprises one or more of a service adaptation function, a header compression function, a security function, an in-order delivery function, a reliability function, a routing function, a concatenation function, a multiplexing function, and a segmentation function.

15. A device for wireless communication, comprising:
a processor in a wireless device configured to:
determine, at the wireless device, prior to receiving a first control plane message from a network node, a specific processing order for processing a plurality of user plane functions;
transmit, by the wireless device to the network node, a second control plane message comprising a request that indicates the specific processing order;
receive, from the network node, the first control plane message comprising information that indicates a processing order for processing the plurality of user plane functions comprising a service data adaptation protocol layer, a packet data convergence protocol layer and a radio link control layer, wherein the processing order is based on at least one of a type of service, a deployment type, a connection mode, one or more capabilities of the network node, or one or more capabilities of a wireless device; and
process the plurality of user plane functions based on the processing order;

wherein the processing order is indicated using numbers, indexes, identities, or types, each representing a particular processing order that specifies a sequence of processes among the service data adaptation protocol layer, a packet data convergence protocol layer and a radio link control layer that are included in the plurality of user plane functions.

16. The device of claim 15, wherein the processing order comprises (a) an explicit ordering of each user plane function of the plurality of user plane functions, (b) a relative position of a first of the plurality of user plane functions with respect to a second of the plurality of user plane functions, or (c) an offset for exactly one user plane function of the plurality of user plane functions, wherein the offset specifies an explicit adjustment of the exactly one user plane function in an initial processing order.

17. A device for wireless communication, comprising:
a processor in a network node configured to:
  receive, prior to transmitting a first control plane message, a second control plane message from a wireless device requesting a specific processing order that determined by the wireless device for processing a plurality of user plane functions;
  determine a processing order for processing the plurality of user plane functions comprising a service data adaptation protocol layer, a packet data convergence protocol layer and a radio link control layer, wherein the processing order is determined based on at least one of a type of service, a deployment type, a connection mode, one or more capabilities of the network node, or one or more capabilities of a wireless device; and
  transmit, to the wireless device, the first control plane message comprising the processing order,
  wherein the processing order is indicated using numbers, indexes, identities, or types, each of numbers, indexes, identities, or types representing a particular processing order that specifies a sequence of processes among the service data adaptation protocol layer, a packet data convergence protocol layer and a radio link control layer that are included in the plurality of user plane functions.

18. The device of claim 17, wherein the processing order comprises (a) an explicit ordering of each user plane function of the plurality of user plane functions, (b) a relative position of a first of the plurality of user plane functions with respect to a second of the plurality of user plane functions, or (c) an offset for exactly one user plane function of the plurality of user plane functions, wherein the offset specifies an explicit adjustment of the exactly one user plane function in an initial processing order.

* * * * *